****

3,485,719
CONTINUOUS PROCESS FOR PRODUCING XANTHOMONAS HETEROPOLYSACCHARIDE
Seymour Peter Rogovin, Pekin, Ill., assignor to the United States of America as represented by the Secretary of Agriculture
No Drawing. Filed Oct. 13, 1967, Ser. No. 675,021
Int. Cl. C12d 13/04
U.S. Cl. 195—31                                                                                 1 Claim

ABSTRACT OF THE DISCLOSURE

Prolonged steady-state productions of polysaccharide by *Xanthomonas campestris* in a single fermentor using a 2.25 percent corn sugar medium are obtained by fermenting in a batchwise manner for about 20 hours and then continuously adding sufficient fresh medium to provide an average residence time of 48–49 hours to the correspondingly withdrawn effluents.

---

A nonexclusive, irrevocable, royalty-free license in the invention herein described, throughout the world for all purposes of the United States Government, with the power to grant sublicenses for such purposes, is hereby granted to the Government of the United States of America.

DETAILED DESCRIPTION OF THE INVENTION

This invention relates to a prolonged continuous fermentation process for accomplishing the continuous production for on the order of about 2 weeks or longer of the well known water-soluble, high molecular weight heteropolysaccharide polymer that is formed from corn sugar, glucose, or other carbohydrate source when the latter is subjected to fermentation by the bacterial organism *Xanthomonas campestris* NRRL B–1459, which specific polymer consequent to its discovery several years ago here at the Northern Regional Research Laboratory of the U.S. Department of Agriculture, has been given the convenient trivial name "Polysaccharide B–1459." More particularly, the invention relates to a prolonged steady-state continuous process employs only a single vessel or fermentor whereby a carbohydrate such as corn sugar (substantially pure glycose) is efficiently and continuously converted to *Xanthomonas campestris* NRRL B–1459 to the above indicated highly viscous heteropolysaccharide that has recently been shown to be an exceptionally effective agent when used in secondary oil recovery operations as well as exhibiting utility as a thickening agent for foodstuffs, cosmetics, etc., also as an edible film-forming agent, and as an emulsifying agent for a wide variety of industrial applications.

The cost reduction benefits of a continuous production process over batch production costs requires neither discussion nor documentation. However, despite the massive resources of the vitally interested petroleum industry, all previous attempts to achieve sustained steady-state, continuous productions of Polysaccharide B–1459, i.e., extending more than about 2.5 or 3 days, have failed through some rapidly ensuing poorly understood exhaustion or loss of the organism's ability to form maximal amounts of the required enzyme, as is clearly set forth in Example I of Lindblom et al., U.S. Patent No. 3,328,262, wherein the patentees found that 48 hours of a logarithmic growth phase batch fermentation that was then modified by continuous additions of partially fermented (24 hours) substrate quickly resulted in the cessation of polymer formation.

In Example II of the above patent, again using a series of three fermentors but applying the principle of first severely limiting the available sugar in the initial 48-hour (batch) phase (first of three fermentor vessels) in order to force cell multiplication and subsequently greatly increasing the sugar content of the medium, using as indicated a series of three fermentors the patentees account for a total process time of only 127 hours (5¼ days) of continuous phase fermentation consisting of a 31.6 hours total of initial residence times and the succeeding 95 hours of steady-state operation. Inasmuch as no appreciable polysaccharide was formed in their first fermentor whereas they achieved only the limited productions of the polymer in the second and third vessels represented by adjusted (5X) viscosities of 25 cps. and 370 cps., respectively, it is evident that this equipment-laden prior art process fails to produce the high yields of Polysaccharide B–1459 necessary for an industrial operation. Furthermore, the apparent termination of the continuous phase at only 95 hours seriously raises the question whether the Lindblom et al. process is operative at the therein described level for an appreciably longer period.

The primary object of the present invention is an industrially advantageous continuous type fermentation process whereby the organism *Xanthomonas campestris* NRRL B–1459 is enabled for a prolonged period of on the order of substantially two weeks or longer to efficiently polymerize a simple sugar to Polysaccharide B–1459 in a single fermentation vessel wherein a steady-state, corresponding to a 48–49 hour average residence time and characterized by a polysaccharide content exhibiting a Brookfield viscosity of about 5200 cps. and being further characterized by a *Xanthomonas* cell content of about 2 mg. in each gram of steady-state material.

Other objects and advantages of our improved process will appear hereinafter or will be apparent to those skilled in the art from the specific example wherein the highly unobvious and materially improved result is believed not to result from slight differences in specific carbohydrate source nor in the 1 percent difference in carbohydrate concentration over those taught in Example I of the above mentioned Lindblom et al. patent, but much more probably results from the presence of *Xanthomonas* cells that were not overstimulated by a log growth phase materially in excess of about 20 hours (thus providing about 2.2 mg. of strong cells per gram of the fermenting material) together with the herein specific 2-day residence time that characterizes and may be a critical requirement for the prolongation of the continuous phase.

EXAMPLE 1

A sterilized 8-liter stainless steel fermentor equipped with turbine-driven agitators, baffles, air sparger, thermometer, the necessary feed and outlet ports and connections, and electrical probes for sensing the pH and foam, was charged with 4430 grams of a sterile aqueous medium having the following percentage composition.

| | |
|---|---|
| Commercial corn sugar (equivalent to 2.0% D-glucose) _____percent__ | 2.25 |
| $Na_2HPO_4$ _____do__ | 0.5 |
| Distillers dried solubles _____do__ | 0.8 |
| $MgSO_4 \cdot 5H_2O$ _____do__ | 0.02 |
| Distilled water (q.s.a.d.) _____do__ | 100.00 |
| Silicone antifoam (GE–60) _____p.p.m.__ | 100 |

The above medium was inoculated with 331 grams (ca. 7% by weight) of a 24-hour shake culture of *Xanthomonas campestris* NRRL B–1459 grown at 25° C. in My broth, see Haynes et al., Appl. Microbiol. 3:6 (1965) p. 361. The inoculum per se exhibited a Brookfield viscosity of 1000 cps., a pH of 7.5, and contained 2.7 mg. of the bacterial cells per gram (gravimetrically and by OD measurements of the slightly acidified inoculum at 650 mμ using a B and L "Spectronic" spectrophotometer and a pre-standardized curve). The inoculated medium was fermented at 28° C. with internal agitation, for 20 hours, 90 mmols $O_2$ per hour per liter being supplied thereto. At 20 hours the batch fermentation was found to contain 2.2 mg. of the *Xanthomonas* cells per gram and to exhibit a Brookfield viscosity at 25° C. of 2200 cps. using a No. 4 spindle at 30 r.p.m., thus indicating the desired extent of the phase of logarithmic growth.

Accordingly, the batch fermentation was now converted to a continuous operation in the same fermentor by continuously metered introductions of additional medium per se at a rate which when balanced by corresponding withdrawals, would provide an average residence time of 48–49 hours, i.e., about 1990–2000 grams each 24 hours or 83 grams per hour or about 1.4 grams per minute, equivalene to a dilution rate of 0.021 per hour.

At 48 hours of continuous fermentation under the above conditions the fermentation reached a steady-state wherein the pH was ±6.25 (0.05), the Brookfield viscosity of the effluent was 5200 cps. (±100), the concentration of polysaccharide in the withdrawn fermentate was 1.38 percent (±0.02), the consumption of D-glucose per day was 34 grams (±2), and the daily yield of Polysaccharide B–1459 was 27.5 grams (±1.6).

The fermentation was continued under the above described steady-state conditions for another 11 days (making a total of at least 13 days) before being terminated only because of evidences of contamination. The 4761 grams of original (inoculated) medium plus additions totalling 25,870 grams contained a total of 643 grams of D-glucose, of which 144 grams were recovered in unconverted form. Thus, 499 grams of the sugar were consumed. The consumed sugar gave rise to amounts of Polysaccharide B–1459 amounting to a total of 396.9 grams which was precipitated in known manner with methanol. Thus, the overall yield of the polysaccharide during the entire fermentation was 79.6 percent based on the amount of consumed sugar.

I claim:
1. An improved single fermentor continuous process for the extended microbial production from corn sugar of polysaccharide polymer by *Xanthomonas campestris* NRRL B–1459, said process comprising:
  (a) fermenting a batch of aqueous medium having a 2.25 percent content of corn sugar and also containing as the inoculum a 24-hour shake culture of *Xanthomonas campestris* NRRL B–1459 that contained 2.7 mg. of *Xanthomonas* cells per gram of the inoculum, the fermentation being conducted at 28° C. under aerobic agitation for about 20 hours whereupon the partially fermented batch contains sufficient polysaccharide polymer to provide a Brookfield viscosity of about 2200 cps. and also contains about 2.2 mg. of *Xanthomonas* cells per gram of fermentate;
  (b) without discontinuing the fermentation, introducing continuously therein for at least 13 days additional inoculum-free medium at a dilution rate of 0.0208 per hour so as to provide an average residence time of 48–49 hours to the corresponding fully fermented effluents, the fermentation at 48 hours after the inception of the additions of medium being characterized by the onset of a steady-state which is maintained for at least another 11 days and is characterized by an average 1.38 percent by weight concentration of the polysaccharide, and a Brookfield viscosity of about 5200 cps.;
  (c) and isolating the polysaccharide from the fully fermented medium.

References Cited

UNITED STATES PATENTS

| | | | |
|---|---|---|---|
| 3,251,749 | 5/1966 | Lipps | 195—31 |
| 3,328,262 | 6/1967 | Lindblom et al. | 195—31 |

U.S. Cl. X.R.

195—115